Patented Jan. 18, 1938

2,105,901

UNITED STATES PATENT OFFICE 2,105,901

FROTH FLOTATION METHOD

Frederic A. Brinker, Denver, Colo.

No Drawing. Application March 20, 1935,
Serial No. 11,998

16 Claims. (Cl. 209—167)

This invention relates to the froth flotation process for the recovery of minerals and has to do particularly with the differential separation of copper sulfides from other sulfides and from gangue.

On some ores it is difficult to recover the maximum amount of copper sulfide from the ore. This is particularly true for many copper ores that contain zinc and/or iron sulfides to which a cyanide compound, such as zinc or sodium cyanide has been added to inhibit the zinc and/or iron sulfides to permit the differential flotation of the copper sulfide either with or without lead sulfide. While it is true that other workers have found some copper ores in which copper sulfides are not inhibited by cyanide, I have found that such ores have some characteristic which permits floating of the copper sulfide without further treatment after addition of cyanide. For example, ores containing considerable amounts of oxidized materials or soluble salts usually may be so handled. However, there are many other ores, especially those which are relatively free from oxidized constituents and soluble salts and ores which appear to exert reducing effects possibly by reason of their sulfide content, wherein the addition of cyanide in amount sufficient to inhibit effectively zinc and/or iron sulfides results in the inhibition of so much copper sulfide as to be economically undesirable. This may vary from smaller percentages up to nearly all the copper sulfide.

I have discovered that in treating ores of the last mentioned types, sulfuric acid produces an activating or reactivating condition for these copper sulfides where they are difficult to float as a result of a previous addition of a cyanide compound. Where a cyanide compound has been added for the purpose of inhibiting zinc and/or iron sulfide, it will ordinarily have been for the purpose of recovering copper sulfide, or both copper and lead sulfides. In this instance, the cyanide will also inhibit some of the copper sulfides. These are then reactivated by the sulfuric acid, which however will not reactivate substantial proportions of the iron and/or zinc sulfides. Where lead sulfide is present, it may be separated from the copper, zinc or iron sulfides by preliminary flotation, or the sulfuric acid may be added in the presence of the lead sulfide to reactivate the copper sulfides so that the lead and copper sulfides are recovered together. I have further discovered that where a cyanide compound has been added for the purpose of inhibiting nickeliferous pyrrhotite, the cyanide will inhibit also some of the copper sulfides when present with this nickeliferous pyrrhotite. In this case sulfuric acid is added to reactivate the copper sulfides for their subsequent flotation and separation from the nickeliferous pyrrhotite. I have also discovered that, while any of the well known promoters such as xanthate and the di-substituted dithiophosphate otherwise known as "aerofloat" give good results in any of the above conditions, thiocarbanilid on most ores gives better results.

It is preferable to add the sulfuric acid after the addition of the cyanide compound. The cyanide compound may be added either to the grinding mill or to the ground ore pulp prior to the flotation operation. The sulfuric acid and the flotation promoter may be added together, or one may be added prior to the other. Better results seem to be obtained on most ores where using thiocarbanilid by adding the sulfuric acid after the promoter has been added to the flotation pulp. The sulfuric acid may be added as a concentrated acid, or as a dilute acid. But where the strong acid is used it is added separately from thiocarbanilid when employed, so as to avoid solution effects which strong sulfuric acid has upon thiocarbanilid. The cyanide used may be sodium cyanide, zinc cyanide or any other cyanide compound soluble or even slightly soluble as well known in the flotation art, to perform a function supposedly of forming a non-activating or inhibiting coating on certain sulfides such as iron and zinc sulfides.

The invention may, therefore, be stated as residing in the use of sulfuric acid as an activator or reactivator for the froth flotation of copper sulfides where they have been inhibited by cyanide compounds, as where such cyanide compounds have been employed to depress zinc or iron sulfides as above mentioned. The invention likewise includes the separation of copper sulfides from zinc and/or iron sulfides by employing a cyanide compound to depress the zinc and/or iron sulfides, and sulfuric acid to activate the copper sulfides and permit froth flotation of the copper sulfides.

The invention further includes such use of the cyanide and sulfuric acid in ores containing both copper and lead sulfides along with zinc and/or iron sulfides, both where the sulfuric acid is added after the flotation of the lead sulfides, the copper sulfides being floated after the addition of the sulfuric acid, and where the sulfuric acid is added before the flotation of the lead sulfide, so that the copper and lead sulfides are froth floated together, the zinc and/or iron sulfides being left in the tailings in each case. As above stated the preferred promoter or collecting agent of those above mentioned to be used in this connection is thiocarbanilid, from the standpoint of either the copper sulfides or the lead sulfides.

To illustrate the application of the invention, the following examples are given of the treatment of ores wherein copper sulfides are depressed upon addition of cyanide to inhibit iron and zinc sulfides:

*Example 1.*—An ore containing 5% copper sulfide, 10% zinc sulfide, 70% iron sulfide and the rest gangue, was ground with water to liberate the different sulfides from each other and from the gangue and then introduced into the flotation machine with the addition of $\frac{2}{10}$ pound per ton of ore of sodium cyanide. A small amount ($\frac{3}{100}$ pound per ton) of thiocarbanilid in solution in ortho-toluidine was added together with sufficient frothing agent and one to three pounds of sulfuric acid per ton of ore, to produce a copper sulfide froth concentrate which was removed by flotation and which contained but little iron and zinc sulfides. The iron and zinc sulfides may be separated by another froth flotation process or rejected as tailing. Instead of the thiocarbanilid solution thiocarbanilid per se or xanthate or other promoter may be used.

*Example 2.*—An ore containing 15 to 20 per cent combined lead, copper, zinc and iron sulfides with gangue was ground in water and then introduced into the flotation machine with ½ pound of sodium cyanide per ton of ore together with sufficient frothing and collecting agents to produce a lead sulfide froth concentrate. Upon froth flotation this concentrate contained most of the lead sulfide with a small amount of copper sulfide and very little zinc and iron sulfides. Here most of this copper sulfide was inhibited by the cyanide. After this froth concentrate was removed, one to three pounds per ton of ore of sulfuric acid was added and sufficient frothing and collecting agents to produce a copper sulfide froth concentrate. Upon froth flotation, substantially all the copper sulfide came over in the concentrate. The zinc and iron sulfides were rejected in the tailing. To recover the zinc sulfide from the tailing, this may next be floated by the addition of any soluble copper compound, such as copper sulfate, and sufficient frothing and collecting agents.

*Example 3.*—An ore containing 15 to 20 per cent combined lead, copper, zinc and iron sulfides contained in gangue, was ground in water and then introduced in the flotation machine with ½ pound per ton of ore of sodium cyanide and two to three pounds of sulfuric acid per ton of ore and sufficient frothing and collecting agents to produce a lead-copper concentrate. In this case, the addition of the sulfuric acid reactivated the copper sulfide, while the iron and zinc sulfides were inhibited. The copper was then froth floated and zinc and iron sulfides were rejected in the tailing. The lead sulfide, of course, came over with the copper sulfide. With this procedure also the zinc may be floated from the tailing as in Example 2 if desired.

*Example 4.*—In an ore containing copper sulfide and iron sulfide where it is desired to make a sharp separation by the froth flotation process between the copper sulfides and the iron sulfides, the ore is ground with water to liberate the sulfides from each other and from the gangue present in the ore and a cyanide compound is added either to the grinding mill so as to be present during the grinding, or the cyanide compound is added to the ground ore pulp prior to the flotation operation. This cyanide compound is a well known inhibitor for iron sulfides but if sufficient cyanide is used to give the best results for the inhibiting of the iron sulfides, some copper sulfides also are inhibited by the cyanide, thereby resulting in a higher tailing loss of copper sulfide. Therefore, prior to the flotation operation in which the copper sulfides are separated from the iron sulfides, sulfuric acid is added to the ore pulp to reactivate the copper sulfides inhibited by the cyanide. This ore pulp is next subjected to a froth flotation treatment in which a flotation collector, such as xanthate or thiocarbanilid, and a flotation frother are added and the copper sulfide removed as a froth copper concentrate, thereby making a sharp separation between the copper sulfide and the iron sulfide. Sometimes it is necessary to add additional sulfuric acid to reactivate the last of the inhibited copper sulfide. After this separation, the iron sulfide may be either rejected as tailing or floated by well known methods to make an iron froth concentrate.

*Example 5.*—In an ore containing copper sulfide and nickeliferous pyrrhotite where it is desired to make a sharp separation by the froth flotation process between the copper sulfides and nickeliferous pyrrhotite, the same method is used. Here also the cyanide compound is a well known inhibitor for nickeliferous pyrrhotite but if sufficient cyanide is used to give the best results for the inhibiting of the nickeliferous pyrrhotite, some copper sulfides are inhibited by the cyanide, thereby resulting in a higher tailing loss of copper sulfide. Therefore, prior to the flotation operation in which the copper sulfides are separated from the nickeliferous pyrrhotite, sulfuric acid is added to the ore pulp to reactivate the copper sulfides inhibited by the cyanide. This ore pulp is next subjected to the froth flotation treatment in which a flotation collector, such as xanthate or thiocarbanilid, and a flotation frother are added and the copper sulfide removed as a froth copper concentrate, thereby making a sharp separation between the copper sulfide and the nickeliferous pyrrhotite. Sometimes it is necessary here also to add additional sulfuric acid to reactivate the last of the inhibited copper sulfide. After this separation, the nickeliferous pyrrhotite may be floated by well known methods to make a nickeliferous froth concentrate.

In the above examples the amounts of sulfuric acid added were based on sulfuric acid of 1.84 sp. gr. Some reactivation of copper sulfides, after they have been inhibited by cyanide, results from the addition of other acids, such as hydrochloric acid, nitric acid, phosphoric acid, but these acids are not so effective as sulfuric acid which is preferred. In Examples 2 and 3, any of the promoters or collecting agents hereinbefore mentioned may be used, including thiocarbanilid, a solution thereof, disubstituted dithiophosphate and xanthate, thiocarbanilid being preferred because of its better results as heretofore stated.

On some ores containing gold and/or silver, the addition of the cyanide (soluble form) results in solution of some of the gold and/or silver, and it is advisable to remove this gold and/or silver-bearing solution from the ore for recovery of contained gold and/or silver.

In the treatment of some ores containing refractory compounds of gold and/or silver and having a high sulfide content, the reducing condition resulting from the high sulfide content together with the cyanide is beneficial for the solution of the gold and/or silver in the ground ore pulp as well as for the inhibiting of the iron and/or zinc sulfides and substantial amounts of copper sulfides. The solution containing the soluble gold and/or silver is separated from the ground ore for subsequent recovery of contained gold and/or silver values. After said solution has been removed from the ground ore, the ore is repulped and the copper sulfides that were inhibited in the presence of the cyanide are reactivated by the addition of sulfuric acid and recovered as a froth concentrate.

In practicing this invention, such factors as collectors, frothing agents, pulp densities and the like, will be controlled by prevailing practices as well known to those skilled in the art. Thus, in the field, pulp densities vary ordinarily between 20% and 40% solids according to the ore, the equipment and other local factors. The proportions here given meet the requirements of these variations.

It is to be understood that these disclosures are merely illustrative of the generic invention and therefore they are not to be taken as necessarily limiting.

I claim:

1. A method for the froth flotation separation of sulfide ores containing copper sulfide and sulfides of the class zinc and iron sulfides, comprising preparing a flotation pulp from the ore, supplying a cyanide compound thereby inhibiting flotation of the sulfides of said class, supplying sulfuric acid thereby activating depressed copper sulfide, supplying a frothing and a promoting agent, subjecting the pulp to froth flotation, and removing a copper sulfide concentrate substantially free from sulfides of said class and rejecting substantially all the sulfides of said zinc and iron class with the tailings.

2. A method for the froth flotation separation of sulfide ores containing lead and copper sulfides and sulfides of the class zinc and iron sulfides, comprising preparing a flotation pulp, adding cyanide to the pulp thereby depressing copper sulfides and sulfides of said class, supplying frothing and promoting agents to the pulp, subjecting the pulp to froth flotation and removing the lead sulfide as a froth concentrate, adding sulfuric acid to the pulp thereby activating the copper sulfide without substantial activation of zinc sulfides of said class, and removing a copper sulfide froth concentrate by subjecting the pulp to froth flotation and rejecting substantially all the sulfides of the zinc and iron class with the tailings.

3. A method for the froth flotation separation of sulfide ores comprising preparing a flotation pulp containing copper sulfides and sulfides of the class consisting of zinc and iron sulfides where copper sulfides are of the character which will be depressed by cyanide, adding cyanide to the pulp thereby depressing iron and zinc sulfides present, supplying sulfuric acid to the pulp, thereby reactivating depressed copper sulfides without reactivation of substantial proportions of iron and zinc sulfides present, supplying frothing and promoting agents to the pulp, and subjecting the same to froth flotation to produce a copper sulfide froth concentrate and rejecting substantially all the sulfides of the zinc and iron class with the tailings.

4. A method for the froth flotation separation of sulfide ores containing lead and copper sulfides and sulfides of the class consisting of iron and zinc sulfides wherein the ore is of such character that the copper sulfides will be depressed by cyanide compounds, preparing a flotation pulp from the ore, supplying cyanide compound thereby depressing the copper sulfide and iron and zinc sulfides present, supplying frothing and promoting agents to the pulp, subjecting the pulp to froth flotation and recovering a lead sulfide froth concentrate, adding sulfuric acid to the pulp thereby activating the copper sulfide without substantial activation of iron and zinc sulfides present, and subjecting the pulp to froth flotation to remove copper sulfide froth concentrate and rejecting substantially all the sulfides of the zinc and iron class with the tailings.

5. A method for the froth flotation of sulfide ores containing lead and copper sulfides and sulfides of the class zinc and iron sulfides wherein the copper sulfides will be depressed at least in part by cyanide in a flotation pulp, comprising preparing a flotation pulp from the ore, adding a cyanide compound to the pulp thereby inhibiting zinc and iron sulfides present, adding sulfuric acid to the pulp to reactivate the depressed copper sulfides, supplying a frothing and promoting agent, and subjecting the pulp to the froth flotation and recovering a lead and copper sulfide froth concentrate and rejecting substantially all the sulfides of the zinc and iron class with the tailings.

6. A method according to claim 3 wherein the sulfides in the ore are copper and zinc sulfides only.

7. A method according to claim 3 wherein the sulfides in the ore are copper and iron sulfides only.

8. A method according to claim 3 wherein the sulfides in the ore are copper sulfide and nickeliferous pyrrhotite only.

9. A method according to claim 3 wherein thiocarbanilid is employed as the promoting agent and is added separately from the sulfuric acid.

10. A method according to claim 3 wherein the metals of the class containing gold and silver are dissolved by the cyanide added and the resulting solution containing these metals is separated from the ground ore and subjected to treatment for recovery of its gold and silver content.

11. A method according to claim 1 wherein the pulp is free from iron sulfides.

12. A method according to claim 1 wherein the pulp is free from zinc sulfides.

13. A method according to claim 5 wherein the ore is free from iron sulfides.

14. A method according to claim 5 wherein the ore is free from zinc sulfides.

15. A flotation method according to claim 5 wherein thiocarbanilid is employed as the promoting agent and is added separately from the sulfuric acid.

16. A method for the froth flotation of sulfide ores containing lead sulfide and sulfides of the class zinc and iron sulfides, comprising preparing a flotation pulp from the ore, adding a cyanide compound and sulfuric acid to the pulp, thereby inhibiting the flotation of zinc and iron sulfides present, supplying a frothing agent and thiocarbanilid as a promoting agent and subjecting the pulp to froth flotation and recovering a lead sulfide froth concentrate substantially free from iron and zinc sulfides and substantially rejecting sulfides of said zinc and iron class with the tailings.

FREDERIC A. BRINKER.